United States Patent Office 3,605,274
Patented Sept. 20, 1971

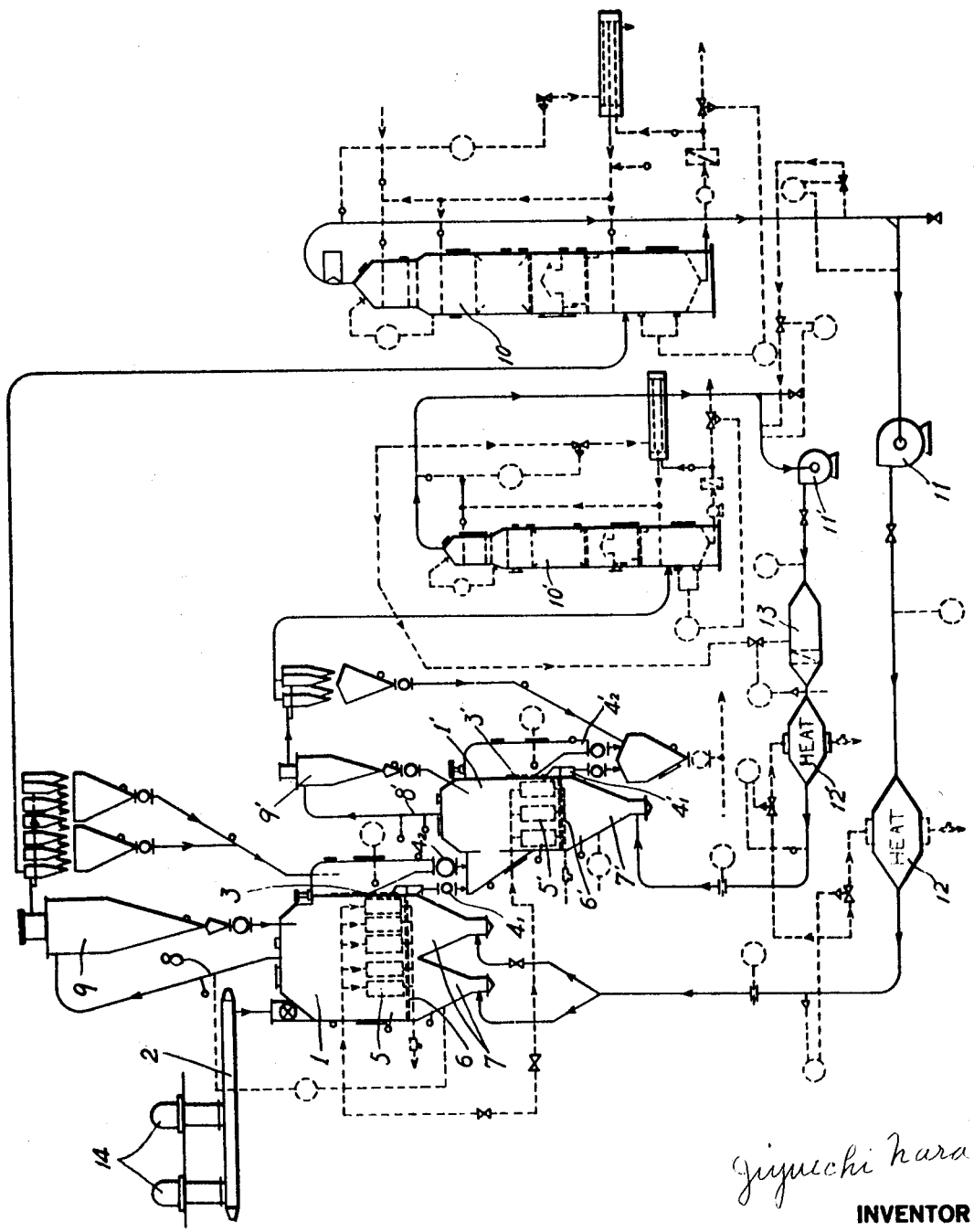

3,605,274
MULTISTAGE FLUIDIZATION POWDER DRYING PLANT USING FLUIDIZING GASES HAVING DIFFERENT DEW POINTS
Jiyuichi Nara, 2-7-8 Higashi-ooi, Shinagawa-ku, Tokyo, Japan
Filed July 7, 1969, Ser. No. 839,249
Claims priority, application Japan, July 13, 1968, 43/49,537
Int. Cl. F26b 17/00
U.S. Cl. 34—57A                               3 Claims

ABSTRACT OF THE DISCLOSURE

A multistage plant for fluidizing and drying powder by use of gas cooled at different dew points, said plant comprising a first stage flow system and a second stage flow system connected thereto, and if necessary, a third and more stages connected in succession by a similar connection system, said first stage flow system including a first stage gas circulating passageway to which are connected a cyclone collector adapted to purify fine powder mixed with exhaust gas of a first stage fluidization powder drying column and collect the fine powder, a means for purifying, cooling and drying said exhaust gas, and a means for heating said gas and forcedly feeding the gas to heated gas regulating chambers provided on the underside of a porous plate of said first stage fluidization powder drying column, said second stage flow system including a second gas circulating passageway in which a dried powder inlet of said second fluidization powder drying column is connected to a dried powder outlet of the first stage fluidization powder drying column of said first stage flow system and a gas drying means are disposed in said first stage gas circulating passageway.

SUMMARY OF THE INVENTION

This invention relates to a plant for drying polyethylene, polypropylene and other synthetic resins or organic and inorganic powder chemicals containing a solvent which is single or conjugate hydrocarbon-based, alcohol-based or some other solvents and water in a solvent gas, by the use of continuous fluidized layers and collecting the solvent gas, in which superheated vapor in a single or azeotropic state in organic solvents and an inert gas such as a nitrogen gas are used as a carrying medium.

In the single-stage powder fluidizing drying plant of the prior art, the total required quantity of heated gas for powder fluidization and drying must be cooled to a temperature as low as in the range of −15 to −20° C. to dry the gas, or alternatively after the gas is dried by the use of a high humidity gas, it has to be purged in a pure nitrogen gas. Accordingly, a great refrigerating apparatus and a large quantity of steam is needed in the former case and a large supplementary quantity of nitrogen has to be used in the latter case.

This invention has for its object the provision of a powder drying plant that can make up for the disadvantages described above, reduce the freezing cost required of the entire plant, economize the quantity of steam used and make it possible that the refilling of nitrogen shall be as small as possible and in such a manner that a gas low in a drying degree at a relatively high dew point is largely used in that part of the dried and heated gas which is used for fluidizing and for drying powder and a small quantity of gas high in a drying degree at a relatively low dew point is used only to finish drying the powder.

This invention relates to a multistage plant for fluidizing and drying powder by the use of gas cooled at different dew points, said plant comprising a first stage flow system and a second stage flow system connected thereto, and if necessary, a third and more stages of flow systems connected in succession by a similar connection system, said first stage flow system including a first stage gas circulating path to which are connected a cyclone collector adapted to purify the fine powder mixed with exhaust gas of a first stage fluidization powder drying column and collect the fine powder, a means for purifying, cooling and drying said exhaust gas, and a means for heating said gas and forcedly feeding the gas to heated gas regulating chambers provided on the underside of the porous plate of said first stage fluidization powder drying column, said second stage flow system including a second gas circulating path in which a dried powder inlet of said second fluidization powder drying column is connected to a dried powder outlet of the first stage fluidization powder drying column of said first stage flow system and a gas drying means is disposed in said first stage gas circulating path.

The present invention will be described with reference to the accompanying drawing showing one embodiment of the invention.

BRIEF DESCRIPTION OF THE DRAWING

The drawing diagrammatically shows by way of example a multistage fluidization powder drying plant of the invention in which gas of different in dew points is used.

DETAILED DESCRIPTION OF THE INVENTION

Referring now to the drawing, a first stage fluidization powder drying column 1 is provided on one side of the top thereof with a moist powder feeder 2 and on the other side thereof with a fence 3. Said fence 3 is provided on the upper and lower edges with dried powder outlets $4_1$ and $4_2$ respectively. Said powder drying column 1 is provided inside thereof with a heat exchanger 5 and on the underside of the porous plate 6 thereof with heated drying gas adjusting chambers 7. To the upper side of the column 1 is connected an outlet pipe 8 for fine powder mixed gas, said pipe 8 leading to a cyclone collector 9, and the gas discharged therefrom is led to a cleansing type or other type dehumidifying column 10. The gas discharged from the column 10 is forcedly fed to the heated drying gas adjusting chambers 7 of the first stage fluidization powder drying column 1 through an air blower 11 and a gas heater 12. The circuit described above is a first stage flow system. A second fluidization powder drying column 1' is provided on one side thereof with a feed opening 2' for dried powder, said opening 2 being connected to the dried powder outlets $4_1$ and $4_2$ of the first stage fluidization powder drying column 1. The second fluidization powder drying column 1' is provided on the other side thereof with a fence 3', said fence 3' being provided on the upper and lower edges thereof with dried powder outlets $4_1'$ and $4_2'$ respectively. The second powder drying column 1' is provided inside thereof with a heat exchanger 5' and on the underside of the porous plate 6' thereof with a heated drying gas adjusting chamber 7'. To the upper side of the column 1' is connected an outlet pipe 8' for fine powder mixed gas, said pipe 8' leading to a cyclone collector 9', and the gas discharged therefrom is led to a dehumidifying column 10'. The gas discharged from the column 10' is forcedly fed to the heated drying gas adjusting chamber 7 of the second powder drying column 1' through an air blower 11', a gas cooler 13 and a gas heater 12'. The circuit described above is a second stage flow system and, if necessary, a third or more flow systems may be likewise connected in succession, thereby to provide a multistage fluidization powder drying plant in which gas cooled at different dew points is used.

In the drawing, the numeral 14 designates a centrifugal dehumidifier.

Next, a description will be given in connection with the use and action of the plant of the present invention with reference to the case in which polypropylene powder is dried by the use of this plant for an illustrating purpose.

(a) First, a description is given of a first stage flow system including a first fluidization powder drying column 1.

In the circulating gas of nitrogen containing heptane $C_7H_{16}$ of high humidity (a dew point of 45° C.), polypropylene to be dried is fed by a moist powder feeder 2 to the first fluidization powder drying column 1 through a centrifugal dehumidifier 14 and is dried from the stage in which moisture content of heptane is 30 to 45% W.B. to the first order balance moisture content of 1.5 to 2.0% W.B. At that time, drying gas in saturation at 45° C. is elevated to a temperature of 120 to 130° C. by a gas heater 12 through steam, and brought into contact with moistened polymer in its fluidized layer. In the fluidized layer, the drying gas thus elevated in temperature dries and dehumidifies said heptane moistened polymer in cooperation with the heat transferred from a heat exchanger 6 and elevates the polymer to a temperature of 60 to 110° C. This discharged gas, because of heat transfer to the powder, is decreased to a temperature of 80 to 95° C. and increased in humidity to a saturation of about 60° C. The gas is then fed to a dust arresting and dehumidifying column 10 through the power arrestor of the cyclone 9 where dust arresting and dehumidifying is effected by spraying of a cooling heptane liquid, restored to a saturation of 45° C. and recirculated. In the dehumidifying column 10, a heptane liquid of a temperature of 35° C. is sprayed from above to cool the gas and condense and collect the heptane vapor thus vaporized. The heptane liquid collected at about 51° C. from the bottom of the column is partly alloted to a solvent step of process, introduced into an indirect heat exchanger, cooled to a temperature of 35° C. with cooling water of 15 to 25° C. and fed back to the top of the column.

(b) Next, a description is made of a second stage flow system including a second fluidization powder drying column 1'.

In the second fluidization drying column 1', polymer, in the circulating gas of nitrogen containing heptane reduced to low humidity (a dew point of −15 to −20° C.) by a gas cooler 13, is elevated from a state of moisture content of 1.5% W.B. (100° C.) to a temperature of 110 to 120° C. and dried to a desired moisture content of 0.1% of a finished product. At that time, the drying gas of necessary and minimum humidity is cooled by the gas cooler 13 to a temperature of −15 to −20° C. and thereafter elevated by a gas heater 12' (indirect heat exchanger) to a temperature of 120 to 130° C. and brought into contact inside the fluidized layer with the polymer fed to the second fluidization drying column 1' of the second stage flow system through the first stage flow system. In the fluidized layer, the gas elevates the polymer to a temperature of 100 to 110° C. in cooperation with the heat transferred from the heat exchanger 5' separately disposed and dries the same to a final desired content of moisture. (The factors in determining the final desired content of moisture are the temperature of polymer and the dew point of the gas coming in contact therewith, and are beyond the influence of the conditions of the aforestated first stage flow system.)

The gas discharged from the second fluidization powder drying column 1' is decreased by heat transfer to a temperature of 100 to 105° C. and, after the powder has been removed by a cyclone 9', it is purged of its fine dust in a dehumidifying column 10' to be reduced in temperature and humidity. Namely, from the top of the column 10' a cooling heptane liquid of −15° C. is sprayed to cool and dehumidify the gas to saturated humidity of −8° C. (The cooling heptane liquid collected by condensing part of the heptane vapor vaporized from the bottom of the column by the second stage drying is fed to the next step of process, introduced into the indirect heat exchanger at a temperature of −3.5° C., and cooled with a cooling liquid of −22° C. (brine from the refrigerator) and fed back at a temperature of −15° C. to the top of the column.)

The gas cooled and dehumidified to a temperature of −8° C. is increased in pressure, then introduced into coolers (indirect heat exchangers of gas and brine), finally cooled and dehumidified with brine of −22° C. (cooling liquid from the refrigerator) to a temperature of −17° C. and circulated as a second stage drying gas.

NOTE.—The cooling heat quantity of brine necessary for cooling is represented in a refrigerating cost load, but the refrigerating cost needed herein is a total of the quantity of heat transfer of primary heat exchange and secondary heat exchange, and is ultimately proportionate to the quantity of circulating nitrogen gas required by the second stage drying. That is to say, a reduction in the quantity of circulating gas would correspondingly decrease the refrigerating cost.

The plant provided by the invention, that is constructed and functions in the manner described above, yields the following results:

(a) As a dew point is made high in the first stage drying system, no special cooling is necessary but a greater part of condensing and cooling is carried out by the use of general industrial water and no refrigerator load is necessary.

As a greater part of load is over in the first stage drying system, the circulating gas can be reduced to its minimum circulation in the second stage drying system, with the result that the refrigerator load is decreased to a minimum load.

The service of refrigerating load is higher in cost than other services, and accordingly a decrease in the cost may be aimed at as a chief object of rationalization of this plant.

(b) Reduction in gas heater service.—A reduction can be made in the quantity of steam used for elevating the cooling of a large flow quantity of first stage drying gas to a desired high temperature (120 to 130° C.). As the low temperature gas in the second stage is minimized, the quantity of steam used can be made exceedingly small. This can be considered to be another object.

(c) Reduction in the quantity of nitrogen gas used.— The necessary quantity of circulation of nitrogen gas both in the first stage and in the second stage can be reduced. As a closed circuit can be used in all the stages, little or no refilling gas is required except for make-up.

(d) Other advantages.—As both first and second stage systems can be constructed of small size, a plant of high efficiency can be established in a small area. And because of its smallness in size, the cost of manufacture can also be decreased. Control of flowing time in the second stage drying system makes it possible to easily dry the materials that are hard to dry by planned operation.

I claim:

1. A multistage plant for fluidizing-flow drying powder consisting of two stages which are connected, in one of which a higher dew point gas is used and in the other a lower dew point gas is used, and comprising:

(a) a first stage fluidizing-flow drying tower (1) in which the higher dew point gas is used for fluidizing;

(b) a cyclone collector (9) above said tower which collects fine powder which is contained in exhaust gas from the said first stage fluidizing-flow drying tower (1);

(c) a cooling apparatus (10) fed by said cyclone collector output for cooling and recovering solvent from the exhaust gas which is a mixed gas of the higher dew point gas and the volatile solvent evaporating from the powder;

(d) a heating apparatus fed by said cooling apparatus to heat and send out with pressure circulating gas, a heated gas controlling chamber (7) and a porous plate (6) over said chamber receiving said gas in the first stage fluidizing-flow drying tower (1), after the solvent is recovered from the said circuit gas;

(e) and the outlet ($4_1$, $4_2$) for dried powder of the first fluidizing-flow drying tower (1), and an inlet (2') of the powder to be dried in the second fluidizing-flow drying tower (1'), is connected thereto;

(f) a second stage fluidizing-flow drying tower (1') in which the lower dew point gas is used for fluidizing;

(g) a cyclone collector (9') above said tower which collects the fine powder in the exhaust gas which is exhausted from the fluidizing-flow tower (1') of the second stage;

(h) a cooling apparatus (10') fed by said cyclone collector to cool and recover the solvent which is in the said exhaust gas and to take out the lower dew point; and, (i) cooling and heating means (13, 12') to heat the said lower dew point gas and send the gas out with pressure; and a heated gas control chamber (7') connected to said heating and cooling means with a porous plate (6') of the second fluidizing-flow drying tower (1') over said chamber.

2. A two stage plant for fluidizing and drying powder by use of a gas, wherein a higher dew point gas is used in one stage and a lower dew point gas is used in the other stage, comprising in combination:

(a) a first stage having a vertical circulating column (1) with a powder feeder (2) on the top at one side thereof, a heat exchanger (5) in said column, a porous plate (7) under said heat exchanger (5), an adjustable gas inlet chamber (7) under said plate, an upper gas outlet pipe (8), cyclone means (9) fed by said pipe (8) said cyclone receiving the fed powder fluidized by gas passing upwards through said chambers, discharging the gas from the top thereof and dropping the powder back into the column;

(b) a powder discharge section ($4_1$, $4_2$) on the other side of said column and a gas discharge pipe connected to the top of said cyclone means;

(c) a first cooling and dehumidifying column arrangement (10) then receiving said drying gas from said first stage removing humidity therefrom having a feedback line force feeding dried gas to said inlet chamber (7);

(d) at least one second stage including a circulating column constructed like said first stage having an input side and receiving thereat powder discharged from said powder discharge section;

(e) a second cooling and dehumidifying column (10') receiving said drying gas from said second stage and removing the humidity therefrom having a feedback line force feeding said dried gas back to said second stage;

(f) heating means (12, 12') in said first and second feedback lines; and, (g) cooling means (13) before the heating means (12') in said second feedback line to cool said fluidized powder to about 0° C.

3. A two stage plant for fluidizing and drying powder by use of a high dew point gas in one stage and a low dew point gas in the other stage comprising:

(a) at least first and second vertical circulating columns each including an input side at one side of the top, a heat exchanger in the column, a porous plate under said heat exchanger, an adjustable gas inlet chamber under said plate, an upper gas outlet pipe, cyclone means with an upper discharge line fed by said pipe receiving powder fluidized by gas passing upwards through said chambers, discharging through said line the gas from the top thereof and dropping powder back into the column, said first column receiving raw powder on its input side and having a discharge side opposite its input side, said second column receiving on its input side the powder discharged from said first column;

(b) first and second cooling and dehumidifying columns connected to said first and second discharge lines for receiving powder moist gas from said first and second columns and supplying dry gas to said first and second gas inlet chambers through a feedback lines;

(c) heating means in said first and second feedback lines; and, (d) cooling means before said heating means in said second feedback line to cool said fluidized powder to about 0° C.

References Cited
UNITED STATES PATENTS

| | | | |
|---|---|---|---|
| 3,212,197 | 10/1965 | Crawford | 34—57AX |
| 3,233,336 | 2/1966 | Oldweiler et al. | 34—57 |
| 3,242,586 | 3/1966 | Peterson | 34—57A |
| 3,309,780 | 3/1967 | Goins | 34—57X |

FREDERICK L. MATTESON, Jr., Primary Examiner

H. B. RAMEY, Assistant Examiner